United States Patent
Olives et al.

(10) Patent No.: US 8,195,516 B2
(45) Date of Patent: Jun. 5, 2012

(54) GENERATING RETAIL SALES REPORT

(75) Inventors: Jeffrey Rolland Olives, Danville, CA (US); Wayne Thomas Best, Union City, CA (US); Jay Hawkins, Livermore, CA (US); Laurence Michael Levin, San Francisco, CA (US); Tim Gunther, Fremont, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 174 days.

(21) Appl. No.: 12/490,846

(22) Filed: Jun. 24, 2009

(65) Prior Publication Data

US 2009/0327045 A1 Dec. 31, 2009

Related U.S. Application Data

(60) Provisional application No. 61/075,514, filed on Jun. 25, 2008.

(51) Int. Cl.
*G06Q 20/00* (2006.01)
(52) U.S. Cl. .................. 705/16; 705/7.33; 705/7.38
(58) Field of Classification Search .................. None
See application file for complete search history.

(56) References Cited

U.S. PATENT DOCUMENTS

| | | |
|---|---|---|
| 2005/0154769 A1 | 7/2005 | Eckart et al. |
| 2005/0198273 A1* | 9/2005 | Childress et al. .............. 709/224 |
| 2006/0015416 A1 | 1/2006 | Hoffman et al. |
| 2007/0299743 A1 | 12/2007 | Staib et al. |
| 2008/0243657 A1* | 10/2008 | Voysey ........................ 705/34 |

OTHER PUBLICATIONS

International Search Report for International Application No. PCT/US09/48487, mailing date Aug. 7, 2009.

* cited by examiner

*Primary Examiner* — Luna Champagne
(74) *Attorney, Agent, or Firm* — Chadbourne & Parke LLP; Walter G. Hanchuk

(57) ABSTRACT

A computer-implemented automated method of generating a report of sales growth estimate from point of sale transaction settlement database includes selecting a subset of the point of sale transaction data that represents sales transactions for accounts in the transaction settlement database that are active during two consecutive reporting periods from the point of sale transaction settlement database. The selected subset of the point of sale transaction data is then analyzed based on a sorting category resulting in an estimate of sales growth rate over the reporting period.

21 Claims, 2 Drawing Sheets

US 8,195,516 B2

GENERATING RETAIL SALES REPORT

CROSS-REFERENCE TO RELATED APPLICATIONS

This is a U.S. non-provisional application of U.S. provisional patent application Ser. No. 61/075,514, filed Jun. 25, 2008, the entirety of which application is incorporated herein by reference.

FIELD OF THE INVENTION

Aspects of the present disclosure relate generally to point of sale (POS) financial transaction settlement data.

BACKGROUND INFORMATION

The members of the financial community such as equity research analysts and investors who invest in individual retail companies and other types of merchants are often in search of historical sales growth rate estimates of the retail industry that are accurate and also readily available without much delay. Such historical sales growth rate estimates would be beneficial to the various members of the retail industry and other industries, such as the banking industry, that service the retail industry by providing insight into the health of the retail industry, as well as overall consumer behavior.

One way of generating such historical growth rate estimates would be to look at the raw sales transaction data of a credit card provider. However, such approach has certain limitations. For example, the raw credit card sales transaction growth will overstate the underlying economic performance of the retail industry because a part of that growth is attributable to the general increase in the consumer acceptance of use of credit cards in retail purchases. Additionally, any portfolio shifts of major financial institutions from one credit card provider to another credit card provider can overstate or understate growth, depending on which credit card provider's sales transaction data is monitored.

SUMMARY OF THE INVENTION

According to an embodiment of the present disclosure, a computer-implemented automated method for generating a report of sales growth estimate from a point of sale (POS) transaction settlement database comprises selecting a subset of the POS transaction data that represents sales transactions for accounts in the transaction settlement database that are active during two consecutive reporting periods from the POS transaction settlement database. The selected subset of the POS transaction data is then analyzed using a programmed computer based on a sorting category resulting in an estimate of sales growth rate over the reporting period. A report containing the analyzed data is generated and stored in a computer readable medium for delivery to a subscriber.

According to another embodiment of the present disclosure, a computer-implemented automated method for generating a report of sales growth estimate from point of sale transaction settlement database comprises selecting a subset of the POS transaction data that represents sales transactions for accounts in the transaction settlement database that are active during two consecutive reporting periods from the POS transaction settlement database. A sorting category information is received from a subscriber over a communication network. The selected subset of the POS transaction data is then analyzed using a programmed computer based on the sorting category resulting in an estimate of sales growth rate over the reporting period. A report containing the analyzed data is generated and stored in a computer readable medium for delivery to a subscriber.

According to another embodiment of the present disclosure, a machine-readable storage medium is encoded with a computer program code, such that, when the computer program code is executed by a processor, the processor performs a method for generating a report of estimated sales growth from a point of sale transaction settlement database. The method comprises selecting a subset of the point of sales transaction data from the point of sale transaction settlement database, the subset representing sales transactions for accounts in the transaction settlement database that are active during two consecutive reporting periods. The subset of the point of sales transaction data is analyzed based on a sorting category resulting in an estimate of sales growth rate over the reporting period. Then a report is generated containing the estimate of sales growth rate for delivery to a subscriber.

According to another embodiment of the present disclosure, a machine-readable storage medium is encoded with a computer program code, such that, when the computer program code is executed by a processor, the processor performs a method for generating a report of estimated sales growth from a point of sale transaction settlement database. The method comprises selecting a subset of the point of sales transaction data from the point of sale transaction settlement database, the subset representing sales transactions for accounts in the transaction settlement database that are active during two consecutive reporting periods. A sorting category identification is then received by the processor from a subscriber over a communication network. Then, the subset of the point of sales transaction data is analyzed using a programmed computer based on the sorting category resulting in an estimate of sales growth rate over the reporting period. Next, a report containing the analyzed data is generated for delivery to the subscriber.

DETAILED DESCRIPTION

According to an embodiment of the present disclosure, a computer-implemented automated method of generating a report of sales growth estimate from point of sale transaction settlement database is disclosed. The method allows a customer to subscribe to a report that includes the sales growth estimate of one or more retail industry sectors selected by the customer. The report can also include the sales growth estimate of one or more retail entities that are members of the retail industry.

Figure 1:
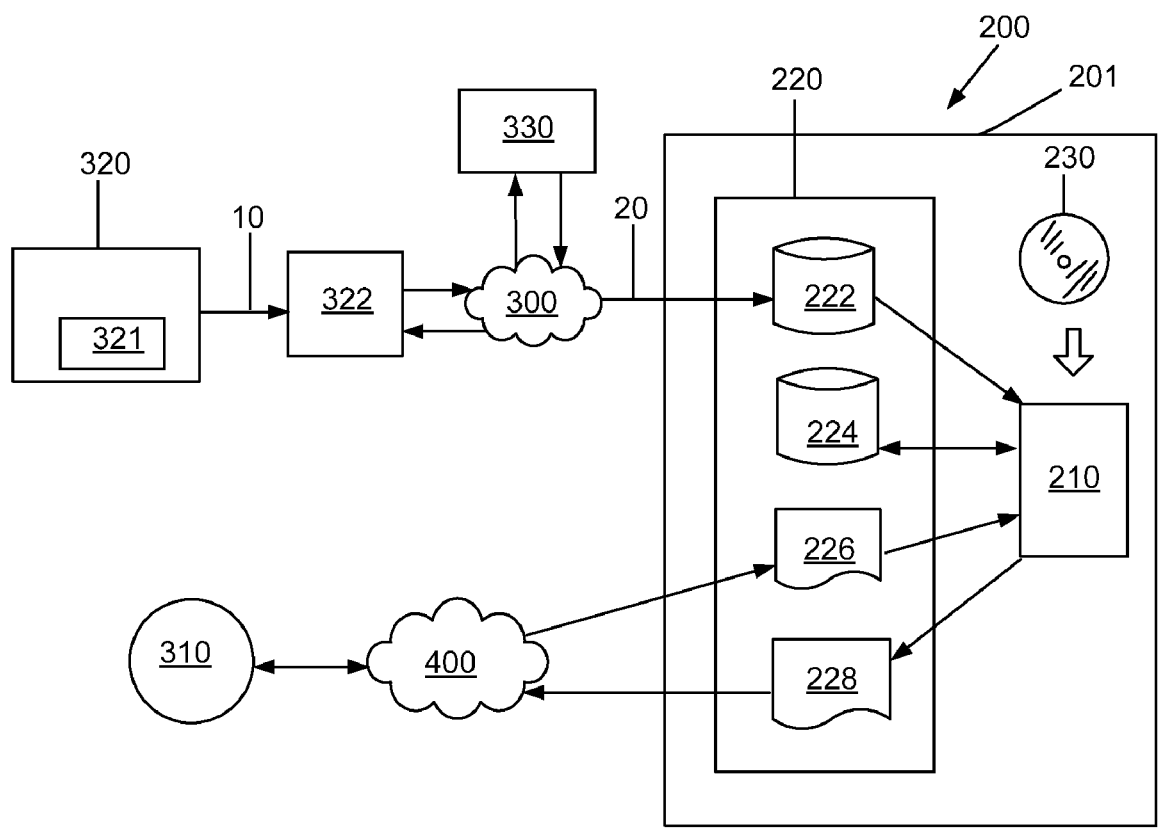
FIG. 1 shows a block diagram of a system according to an embodiment of the present disclosure.

FIG. 1 is a block diagram of a system 200 that embodies the method of the present disclosure. FIG. 1 illustrates one POS merchant 320, one customer 310, one acquirer 322 and one payment processing network (PPN) 300 interacting with the system 200 for simplicity of illustration. It is understood that embodiments of the present disclosure may involve more or fewer components or entities than are shown in FIG. 1.

The POS merchant 320 is where the POS transactions take place, and may be a retail store having at least one electronic POS terminal 321, for example. The POS transactions can be executed by a portable payment device that can be a credit card, a debit card, a prepaid card in any suitable form for interfacing with the POS terminal 321. For example, suitable portable payment devices can be hand-held and compact so that they can fit into a consumer's wallet and/or pocket. They may include smart cards, magnetic stripe cards, wireless payment cards and keychain devices (such as VISA, Inc.'s payWave), etc. Other examples of portable payment devices include cellular phones, personal digital assistants (PDAs), pagers, payment cards, security cards, access cards, smart media, transponders, and the like. These portable payment devices can function as a credit card, debit card, prepaid card, reloadable card, etc. or any payment instrument that is associated with an account that can be used for payment.

Typically, raw POS transaction data 10 containing portable payment device transactions such as credit card purchase transactions, debit card transactions, etc., from the POS terminal 321 of the POS merchant 320 is processed by the acquirer 322, which interfaces with the PPN 300 such as VisaNet™ operated by Visa Inc., of San Francisco, Calif., and the resulting POS transaction settlement data 20 is received at the PPN provider 201 (such as Visa Inc.). Such PPN provider 201 is also referred to herein as a portable payment device brand. In some embodiments, the merchant 320 completes the transaction and sends a payment request to the acquirer 322. The acquirer 322 submits the payment request to the PPN 300 for settlement. The PPN 300 debits the portable payment device account of issuer 330 and credits the account of the acquirer 322, which then credits the merchant 320.

The PPN provider 201 can have or operate a server computer 210 and one or more database storage device(s) 220. As used herein, a "server computer" can be a single computer or a cluster of computers. For example, the server computer 210 can be a mainframe computer, a minicomputer cluster, or a group of servers functioning as a unit. In one example, the server computer 210 may be a database server coupled to a Web server. A server computer 210 services the requests of one or more client computers (not shown). The database storage device(s) 220 illustrated in FIG. 1 can be a single data storage unit or storage system comprising a multiple data storage units, and may include magnetic, optical or solid-state storage media, or a combination thereof, for example.

At the PPN provider 201, the POS transaction settlement data 20 is stored in the database storage device(s) 220 as a POS transaction settlement database 222. According to one embodiment of the present disclosure, a subset of the POS transaction data representing all of the sales transactions made on each portable payment device account for which the same account is active in two consecutive reporting periods is selected from the POS transaction settlement database 222. The subset of the POS transaction data selected from the POS transaction settlement database 222 is stored in the database storage device(s) 220 as a subset POS transaction database 224. The POS transaction settlement database 222 contains at least the merchant information, the transaction amount, the date of the transaction and the portable payment device account information. Thus, the selection process can be carried out by the server computer 210 running an appropriate application program, which may include a database management system, such as the Oracle Relational Database Management System sold by Oracle Corporation of Redwood Shores, Calif., or other commercial or proprietary DBMS.

Because the retail sales growth estimate by the method of the present disclosure is based on monitoring the POS transaction data of one portable payment device brand (e.g., VISA, MASTERCARD, etc.), this selection metric of selecting the sales transactions made on each portable payment device account for which the same account is active in two consecutive reporting periods minimizes overstating the underlying economic performance that can result from sales transactions attributed to those consumers who are migrating from one brand of a portable payment device to another brand in the current year. This selection metric also minimizes or eliminates the effect of general increase in the public's use of portable payment devices by the consumers. In other words, the sales transactions attributed to those consumers who are just switching from using cash or personal check to portable payment devices are not included.

The selection metric can also include additional selection criteria to select those POS transaction data that was produced from one or more particular type of portable payment devices that are particularly relevant to an industry sector of interest to the customer requesting the sales growth estimate report. For example, the POS transaction data from corporate credit card or small business owner credit cards rather than personal credit cards might be more relevant to monitoring the sales growth estimate of a certain industry sector.

The PPN 300 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial POS transactions. VisaNet™, in particular, includes a VIP system (Visa Integrated Payments system) which processes authorization requests and a Base II system which performs clearing and settlement services. The PPN 300 may use any suitable wired or wireless network, including Local Area Networks (LANs), a wide area network (WAN), or the Internet.

After the selected subset POS transaction database 224 is established, a programmed computer such as the server computer 210 analyzes the data contained in the subset POS transaction database 224 based on a sorting category 226 resulting in an estimate of sales growth over the reporting period compared to the previous reporting period. The duration of the reporting periods can be defined to be any length that the customer requesting the report would like it to be. For example, a reporting period can be one week, multiple weeks, one month, multiple months, one year, two years, a decade, etc. A one-year reporting period can be matched to a calendar year spanning January through December. Alternatively, a one-year reporting period can be matched to the fiscal year of the particular customer requesting the report.

The sorting category 226 can be any sorting criteria that can be applied to the selected subset POS transaction database 224 allowing the final report on estimated sales growth to have any desired granularity allowed by the various attribute data associated with the POS transaction data. Each entry in the selected subset POS transaction database 224 has one or more attribute data associated therewith. Some examples of such attribute data are the merchant's name or identity, the account number of the portable payment device, the dollar value of the transaction, Merchant Category Code (MCC), etc. Examples of merchant segments corresponding to the MCCs include traditional retailers (e.g. apparel, home furnishings, electronics, grocery, pharmacies), service industries (restaurants, travel, and entertainment), and others.

The sorting category 226 can then be defined to be any one or more of the attribute data and the analysis of the selected subset POS transaction database 224 can involve sorting the selected subset POS transaction database 224 according to one or more of the sorting categories 226 and comparing the sorted sales number to the previous reporting period to determine the growth and estimate the sales growth or growth rate. Because the method extrapolates the total sales growth rate (or sales growth) estimate from the POS transaction data derived from the raw sales data of one portable payment device issuer, the sales growth rate (or sales growth rate) determined from this analysis is referred to as an estimate of the sales performance as representative of the particular segment of the retail industry. For example, the selected subset POS transaction database 224 can be sorted by industry sectors, one or more particular individual merchants, or by an MCC. An MCC is a four-digit number assigned to a business by a portable payment device issuers such as VISA when the business first starts accepting one of the portable payment device as a form of payment. The MCCs are used to classify the businesses by the type of goods or services they provide. The MCCs categorizes all merchants subscribing to the issuer's PPN 300 service into a particular industry sector.

The sorting categories 226 can be predefined and stored in the data storage device(s) 220 and accessed by the computer server 210 when necessary. In this embodiment, the customer 310 can select from the predefined sorting categories 226 when subscribing to the reporting service from the PPN provider 201.

According to another aspect of the present disclosure, the sorting category 226 can be provided to the PPN provider 201 by the customer 310 over a communication network 400. The customer 310 can provide the sorting category 226 during the initial ordering or subscribing to the reporting service. Subsequently, the customer 310 can revise or update the sorting category any time to further customize the report. In some embodiments, the communication network 400 is the Internet or a proprietary network.

The computer server 210 then generates a report 228 containing the estimate of sales growth information 30. The report 228 can be stored in the database storage device(s) 220 and delivered to the customer 310 via the communication network 400.

Figure 2:
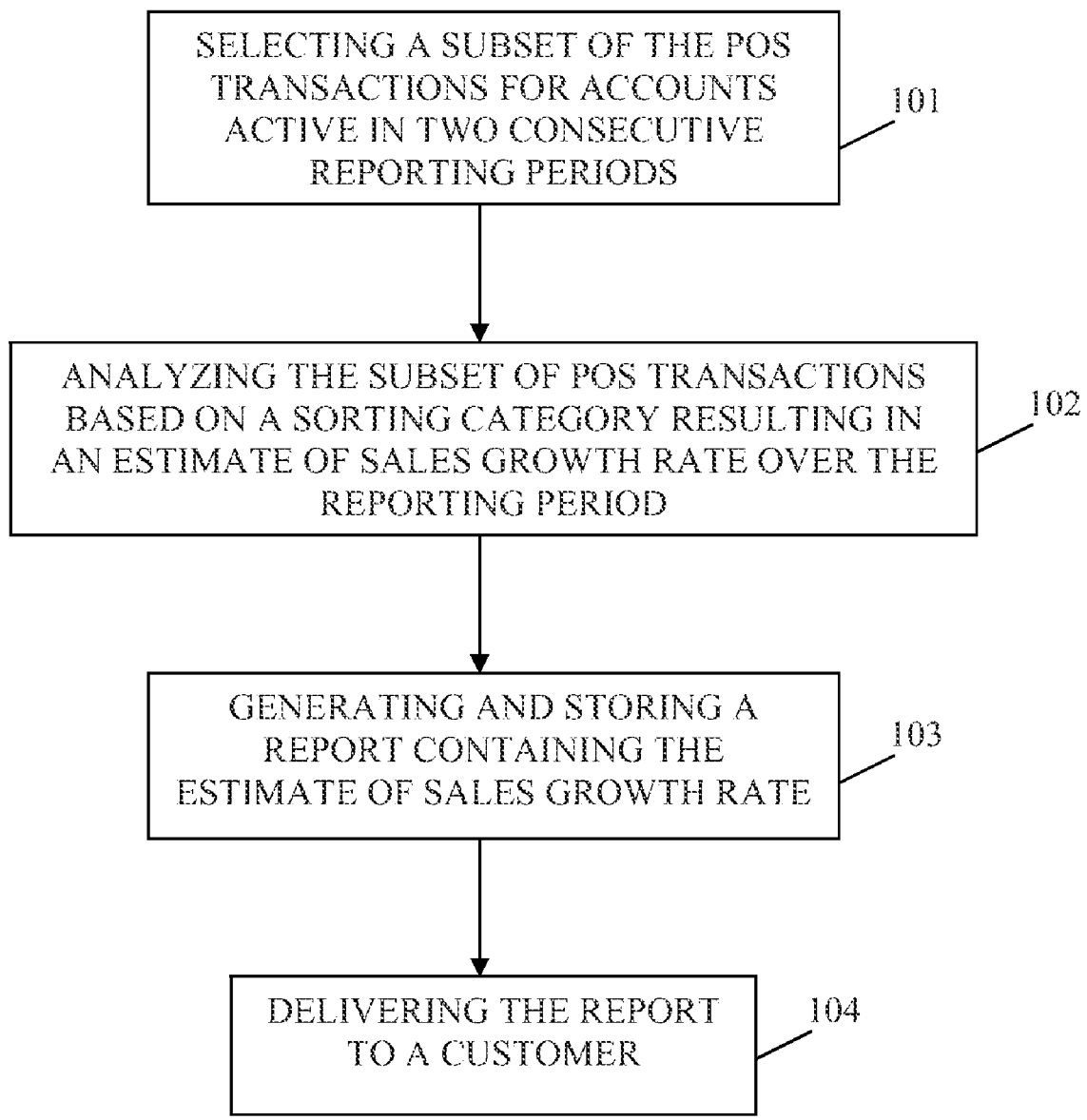
FIG. 2 shows a flowchart illustrating a method according to an embodiment of the present disclosure.

FIG. 2 is a flowchart 100 illustrating the method, comprising selecting a subset of the POS transaction data that represents all the sales transactions made on each credit card account that is active in two consecutive reporting periods from the POS transaction settlement database (see block 101). The selected subset of the POS transaction data is then analyzed using a programmed computer based on a sorting category resulting in an estimate of sales growth over the reporting period (see block 102). A report containing the analyzed data is generated for delivery to a subscriber (see block 103). The report may be provided to the subscriber by transmitting it over the communication network 400 or a different network (see block 104).

A computer program code including a set of instructions, such that, when the computer program code is executed by a processor the processor performs the method for generating a report of estimated sales growth from a point of sale transaction settlement database discussed herein, can be provided to the computer server 210 preloaded in a machine-readable storage medium such as the database storage device(s) 220. Alternatively, such computer program code can be provided on a portable machine-readable storage medium 230 such as a random access memory device, a read only memory device, a magnetic medium such as a hard-drive or a floppy disk, or an optical medium such as a Compact Disc, a DVD, etc. and then loaded on to the database storage device(s) 220 of the computer server 210. Any such machine-readable storage medium, whether it be the portable machine-readable storage medium 230 or the database storage device(s) 220, may reside on or within a single computational apparatus, and may be present on or within different computational apparatuses within a system or network.

Thus, according to an aspect of the present disclosure the system 200 comprises a server computer 210, the server computer 210 comprising a machine-readable storage medium 220 and the server computer 210 in operative communication with a payment processing network 300, wherein point of sale transaction settlement data 20 are received from the payment processing network 300 and stored in a database storage device 220 as the point of sale transaction settlement database 222.

Because the estimated sales growth rate report described herein is based on actual sales transactions, the report can help the subscribers predict how retail companies or industry segments are performing against expectations, before results are reported to the public. The report can also help investors and analysts to better understand the overall consumer behavior and trends across multiple merchant segments.

The report can be distributed to the subscribing customer on regular basis in electronic format. In order to address sensitivity of corporations and other business entities regarding their raw financial performance data, the report generated according to the method of the present disclosure can be formatted and/or aggregated to mask individual company sales growth data through the use of peer groups and industry segments. Such method also prevents disclosure of the portable payment device issuer's own performance.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

One or more features from any embodiment may be combined with one or more features of any other embodiment without departing from the scope of the invention. A recitation of "a", "an" or "the" in the above description is intended to mean "one or more" unless specifically indicated to the contrary.

What is claimed is:

1. A computer-implemented automated method for generating a report of estimated sales growth from a point of sale transaction settlement database, comprising:
   selecting a subset of the point of sales transaction data from the point of sale transaction settlement database, said subset representing sales transactions for accounts in the transaction settlement database that are active during two consecutive reporting periods;
   selecting from said subset of the point of sales transaction data those point of sales transactions made on portable payment device accounts of a particular type;
   analyzing said subset of the point of sales transaction data associated with said portable payment device accounts of a particular type using a programmed computer based on a sorting category resulting in an estimate of sales growth rate over said reporting period; and
   generating and storing in a machine-readable medium a report containing said estimate of sales growth rate for delivery to a subscriber.

2. The method of claim 1, further comprising transmitting said report over a communication network to said subscriber.

3. The method of claim 1, wherein said sorting category comprises an industry sector.

4. The method of claim 1, wherein said sorting category comprises an individual merchant.

5. The method of claim 1, wherein said sorting category comprises a Merchant Category Code.

6. The method of claim 1, further comprising further selecting those point of sales transactions that involved purchase of one or more predefined product types.

7. A machine-readable storage medium encoded with computer program code, such that, when the computer program code is executed by a processor, the processor issues instructions to:
- select a subset of the point of sales transaction data from the point of sale transaction settlement database, said subset representing sales transactions for accounts in the transaction settlement database that are active during two consecutive reporting periods;
- select from said subset of the point of sales transaction data those point of sales transactions made on portable payment device accounts of a particular type;
- analyze said subset of the point of sales transaction data associated with said portable payment device accounts of a particular type based on a sorting category resulting in an estimate of sales growth rate over said reporting period; and
- generate a report containing said estimate of sales growth rate for delivery to a subscriber.

8. A computer-implemented automated method for generating a report of sales growth estimate from point of sale transaction settlement database, comprising:
- selecting a subset of the point of sales transaction data from the point of sale transaction settlement database, said subset representing sales transactions for accounts in the transaction settlement database that are active during two consecutive reporting periods;
- selecting from said subset of the point of sales transaction data those point of sales transactions made on portable payment device accounts of a particular type;
- receiving a sorting category identification from a subscriber over a communication network;
- analyzing said subset of the point of sales transaction data associated with said portable payment device accounts of a particular type using a programmed computer based on said sorting category resulting in an estimate of sales growth rate over said reporting period; and
- generating and storing in a machine-readable medium a report containing said analyzed data for delivery to said subscriber.

9. The method of claim 8, further comprising transmitting said report over said communication network to said subscriber.

10. The method of claim 8, further comprising transmitting said report over a second communication network.

11. The method of claim 8, wherein said sorting category comprises an industry sector.

12. The method of claim 8, wherein said sorting category comprises an individual merchant.

13. The method of claim 8, wherein said sorting category comprises a Merchant Category Code.

14. The method of claim 8, further comprising further selecting those point of sales transactions that involved purchase of one or more predefined product types.

15. A machine-readable storage medium encoded with a computer program code, such that, when the computer program code is executed by a processor, the processor issues instructions to:
- select a subset of the point of sales transaction data from the point of sale transaction settlement database, said subset representing sales transactions for accounts in the transaction settlement database that are active during two consecutive reporting periods;
- select from said subset of the point of sales transaction data those point of sales transactions made on portable payment device accounts of a particular type;
- receive a sorting category identification from a subscriber over a communication network;
- analyze said subset of the point of sales transaction data associated with said portable payment device accounts of a particular type based on said sorting category resulting in an estimate of sales growth rate over said reporting period; and
- generate a report containing said analyzed data for delivery to said subscriber.

16. The method of claim 1, wherein point of sale transaction settlement data are received from a payment processing network and stored in said point of sale transaction settlement database.

17. The method of claim 8
wherein point of sale transaction settlement data are received from a payment processing network and stored in the point of sale transaction settlement database.

18. The medium of claim 7
wherein point of sale transaction settlement data are received from a payment processing network and stored in the point of sale transaction settlement database.

19. The medium of claim 15
wherein point of sale transaction settlement data are received from a payment processing network and stored in the point of sale transaction settlement database.

20. A system for generating a report of estimated sales growth from a point of sale transaction settlement database, comprising:
- a memory;
- a processor disposed in communication with said memory, and configured to issue a plurality of processing instructions stored in the memory, wherein the processor issues instructions to:
  - select a subset of the point of sales transaction data from the point of sale transaction settlement database, said subset representing sales transactions for accounts in the transaction settlement database that are active during two consecutive reporting periods;
  - select from said subset of the point of sales transaction data those point of sales transactions made on portable payment device accounts of a particular type;
  - analyze said subset of the point of sales transaction data associated with said portable payment device accounts of a particular type based on a sorting category resulting in an estimate of sales growth rate over said reporting period; and
  - generate and store a report containing said estimate of sales growth rate for delivery to a subscriber.

21. A system for generating a report of sales growth estimate from point of sale transaction settlement database, comprising:

a memory;

a processor disposed in communication with said memory, and configured to issue a plurality of processing instructions stored in the memory, wherein the processor issues instructions to:

select a subset of the point of sales transaction data from the point of sale transaction settlement database, said subset representing sales transactions for accounts in the transaction settlement database that are active during two consecutive reporting periods;

select from said subset of the point of sales transaction data those point of sales transactions made on portable payment device accounts of a particular type;

receive a sorting category identification from a subscriber over a communication network;

analyze said subset of the point of sales transaction data associated with said portable payment device accounts of a particular type based on said sorting category resulting in an estimate of sales growth rate over said reporting period; and generate and store a report containing said analyzed data for delivery to said subscriber.

\* \* \* \* \*